Sept. 3, 1957      E. E. LUSK      2,804,705
VEHICLE OPERATED HORIZONTALLY PIVOTED GATE
Filed Jan. 26, 1956      2 Sheets-Sheet 2
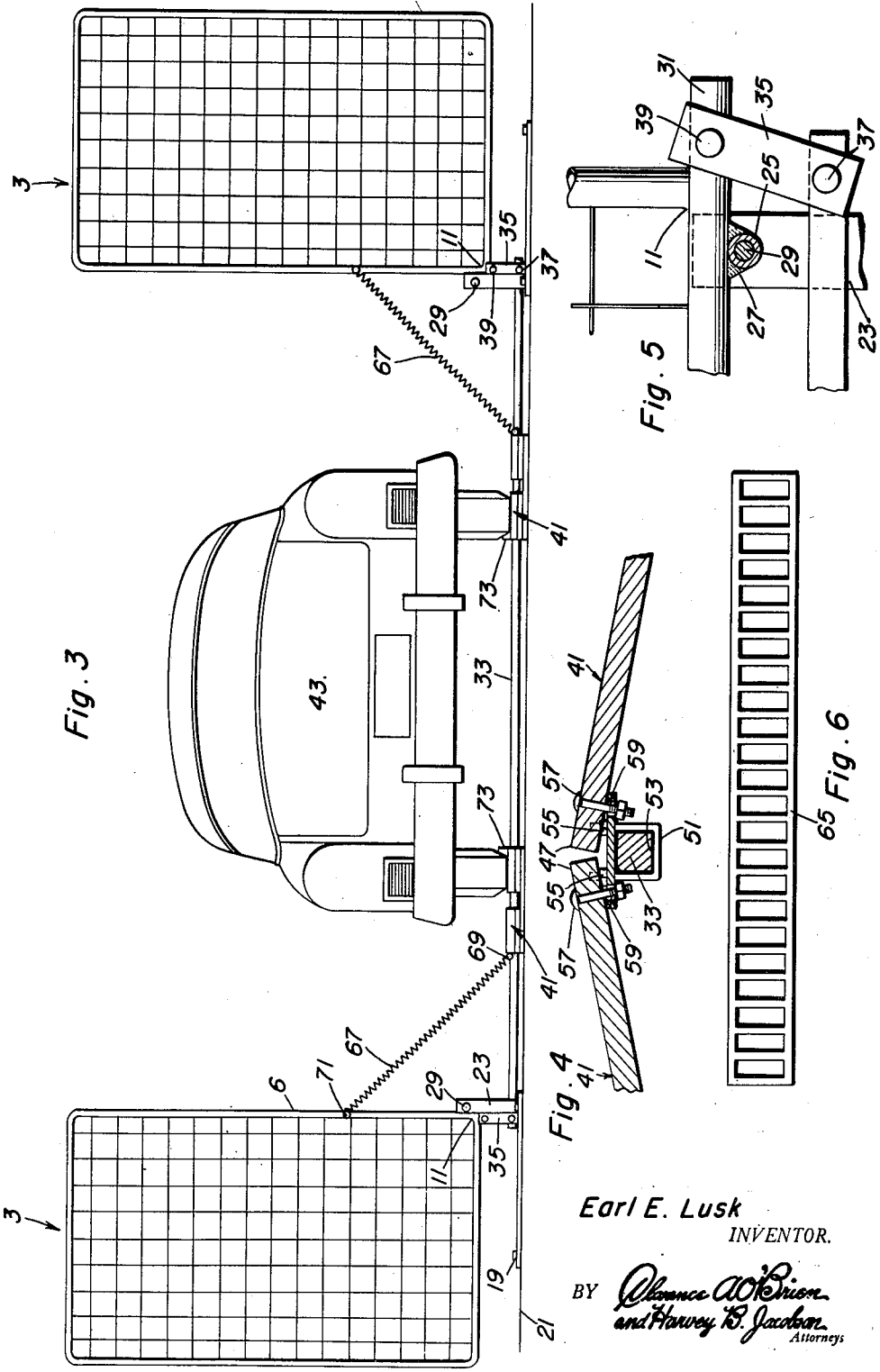
Earl E. Lusk
INVENTOR.
BY *Clarence A. O'Brien*
*and Harvey B. Jacobson*
Attorneys

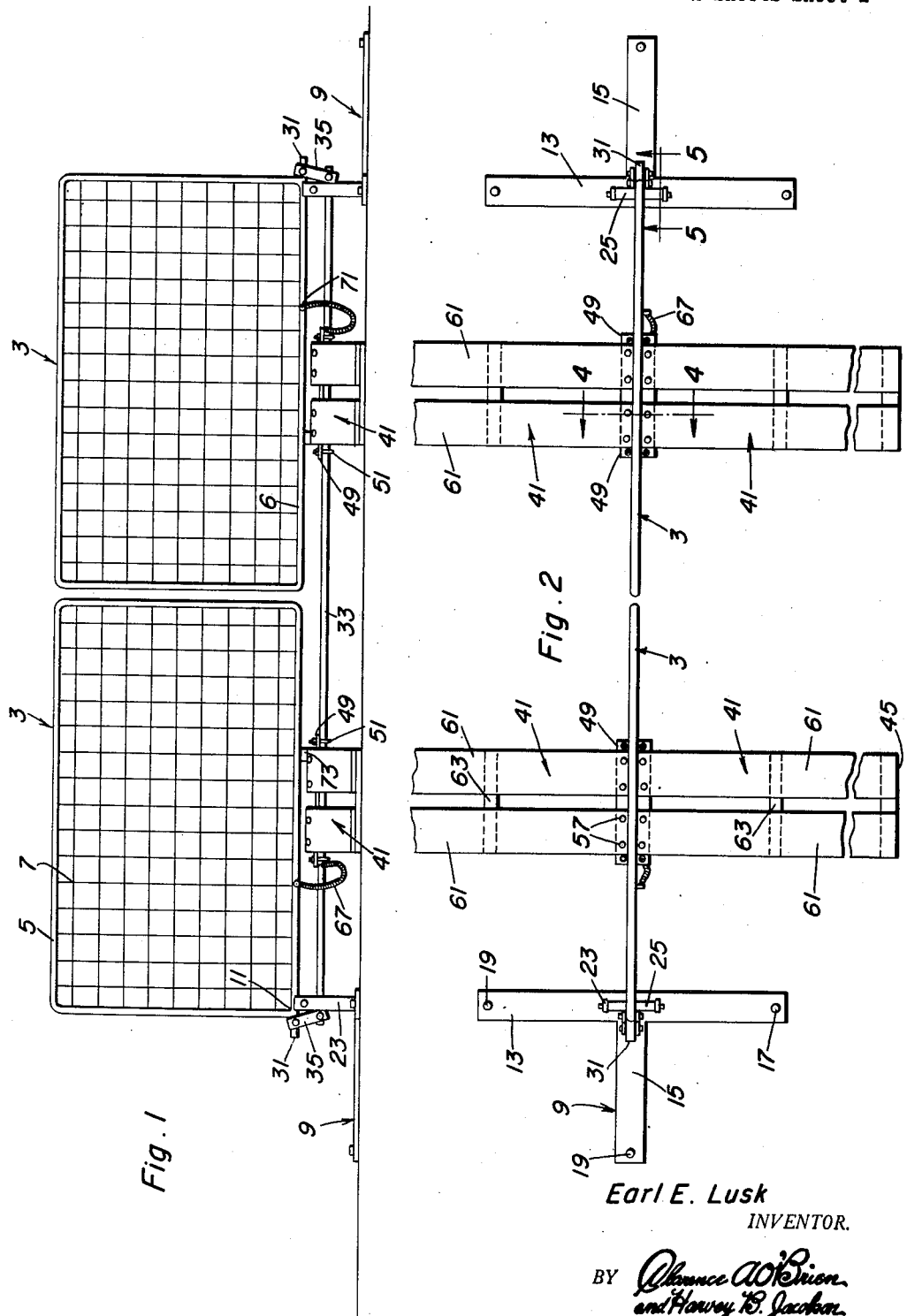

United States Patent Office 2,804,705
Patented Sept. 3, 1957

2,804,705

VEHICLE OPERATED HORIZONTALLY PIVOTED GATE

Earl E. Lusk, Highmore, S. Dak.

Application January 26, 1956, Serial No. 561,395

1 Claim. (Cl. 39—43)

My invention relates to improvements in road or driveway gates and to opening means therefor operative by vehicles approaching the same.

An important object of my invention is to provide gate opening means in the form of ramps on which an automobile may be driven from opposite sides of a pair of gate sections, and operating connections between the ramps and gate sections comprising a single bar depressible by the ramps to exert leverage against the gate sections for opening the same, together with means for pivotally mounting the gate sections without gate posts all for the purpose of providing an efficient inexpensive simplified gate structure and operating means therefor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation illustrating a preferred embodiment of the invention with the gates shown closed;

Figure 2 is a view in plan of the same;

Figure 3 is a view in front elevation with the gates shown open;

Figure 4 is an enlarged fragmentary view in transverse section taken on the line 4—4 of Figure 2;

Figure 5 is an enlarged fragmentary view on transverse section taken on the line 5—5 of Figure 2; and Figure 6 is a view in plan of a modified ramp.

Referring to the drawings by numerals, according to my invention a pair of coplanar gate sections 3, are provided each including a rectangular frame 5 for mesh wire 7 and which are pivotally mounted for vertical swinging movement into open and closed position by means of the following.

A pair of T-shaped anchor plates 9 are provided beneath the remote or rear lower corners 11 of the gate sections 3 and which include cross heads 13 extending transversely of said sections and stems 15 extending longitudinally of and outwardly of said corners 11. The plates 9 are provided with terminal openings 17 by means of which and stakes 19 driven therethrough into the ground said plates are anchored and the plates 9 are provided at opposite sides of the transverse center of the cross heads 11 with pairs of upstanding laterally spaced ears 23.

The gate sections 3 are pivoted adjacent their rear lower corners 11 between the pairs of ears 23 by means of transverse horizontal bearing sleeves 25 welded as at 27 to the bottoms of the sections 3, and horizontal pivot pins 29 suitably fixed in the pairs of ears and extending through the sleeves 25 transversely of the sections 3. The frames 5 at lower rear corners 11 thereof are provided with outwardly rearwardly extending portions providing short lever arms 31 parallel with the lower edges 6 of said frames 5 and serving a purpose presently explained.

A polygonal gate opening bar 33 extends beneath the gate sections 3 parallel therewith and between the ears 23 of the pairs. Pairs of upright links 35 straddling the ends of the bar 33 and the lever arms 31 are pivoted to said bar and arms as at 37, 39 and in the closed position of the gate sections 3 suspend said bar 33 above the ground 21 in elevated position for depression, the arrangement being such that depression of the bar 33 causes the links 35 to exert downward pull on the lever arms in the rear of the pivots 39 to swing the gate sections 3 upwardly into open position.

A pair of rectangular ramps 41 are provided at each side of the gate opening bar 33 to incline downwardly transversely therefrom and are spaced apart in each pair with the ramps in one pair aligned with those in the other pair so that a vehicle such as an automobile 43 may travel on the ramps over said bar 43 from either side of the gate sections 3. Outer ends 45 of the ramps 41 rest on the ground 21, whereas inner ends 47 of said ramps 41 are pivotally connected to the gate opening bar so that the weight of an automobile 43 travelling over the ramps 41 will depress said bar 33.

The pivotal connection between the ramps 41 and the gate operating bar 33 preferably comprises rectangular plates 49 on said bar on which the inner ends 47 of said ramps 41 rest, U-bolts 51 welded as at 53 to said bar 33 and passing through ends of said plates 43 with nuts 55 thereon and bolts 57 in the inner ends 47 of the ramps 41 spaced laterally of the ramps and extending through and pivoting in openings, as at 59, in side edges of said plates as best shown in Figure 4. Preferably the ramps 41 comprise side by side panels 61 cross connected by cleats 63. However, as shown in Figure 6, a grid type ramp 65 may be used.

A pair of coil tension springs 67 are suitably connected at one end thereof, as at 69, to the plates 49 with their other ends connected, as at 71, to the lower edges 6 of the frames 5 and act to tension the gate sections 3 against opening movement, as the gates approach fully opened position.

Rubber bumpers 73 on the plates 49 support and cushion the gate sections 3 by engaging the lower edges 6 of the frames 5.

The operation of my invention will be readily understood. When an automobile 43 travels up the ramps 41 at either side of the gate sections 3, said ramps 41 are swung downwardly on their outer ends 45, pivot on the plates 49 and under the weight of the load depress the gate opening bar 33 which through the links 35 pulls the lever arms 31 downwardly to swing the gate sections 3 upwardly oppositely into open position as shown in Figure 3 before the automobile 43 enters between the gate sections 3. As the automobile passes onto the other pair of ramps 41 said other pair are maintained in downswung position to maintain said sections 3 open until the automobile passes completely from between the gate sections 3. At this point the springs 67 which have been stretched by opening of the gate sections react to close said sections into the position shown in Figure 1 and the gate sections 3 elevate the bar 33 whereby the ramps 41 are swung upwardly on their outer ends 45 into operative starting position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In a vehicle operated gate, a pair of rectangular vertical gate sections disposed in a common plane and have lower remote corners, a pair of T plates beneath said sections having cross heads extending beneath said corners transversely thereof and having stems extending longitudinally of said gate in the plane thereof, a pair of upstanding ears rising from each cross head at the center thereof in straddling relation to said corners and to which said corners are pivoted for vertical swinging of the gate for opening and closing, a horizontal depressible gate operating bar below said sections guidingly interposed between said pairs of the ears, means operatively connecting said bar to said corners to swing said sections opening, vehicle operative means connected to said bar to compress the same, and coil springs for closing said sections terminally connected to said sections and to said bar for stretching by opening of said sections and depression of said bar.

References Cited in the file of this patent

UNITED STATES PATENTS

| | | |
|---|---|---|
| 239,360 | Bascom | Mar. 29, 1881 |
| 1,766,564 | Thomas | June 24, 1930 |
| 2,699,005 | Thomson | Jan. 11, 1955 |